July 21, 1959.  J. R. BOXCER ET AL  2,896,098
ULTRASONIC PROBES

Filed July 1, 1955   2 Sheets-Sheet 1

*Inventor*
John R. Boxeer
Hans Bincer
By
*Attorney*

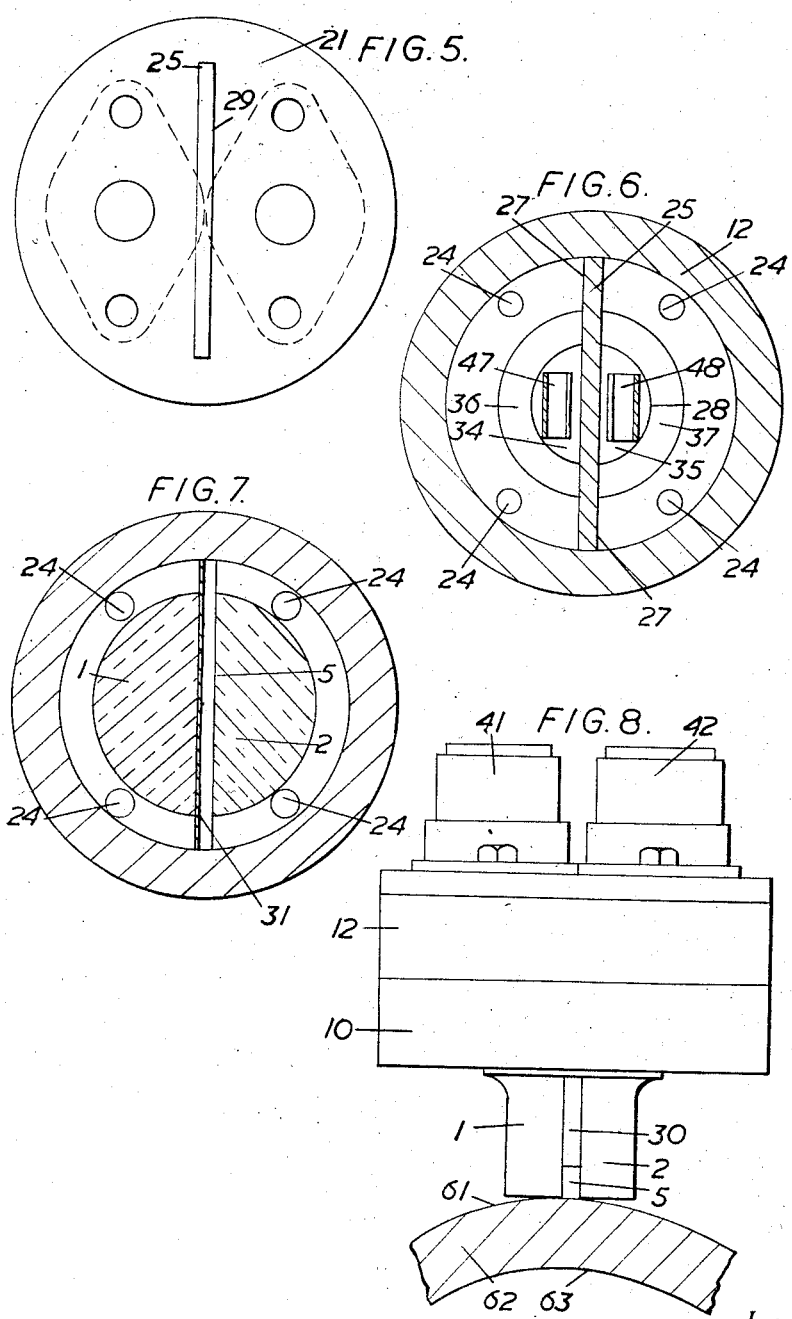

United States Patent Office 2,896,098
Patented July 21, 1959

2,896,098

ULTRASONIC PROBES

John R. Boxcer and Hans Bincer, London, England, assignors to The Babcock & Wilcox Company, New York, N.Y., a corporation of New Jersey Application July 1, 1955, Serial No. 519,476

8 Claims. (Cl. 310—8.1)

This invention relates to ultrasonic probes and particularly to ultrasonic probes for determining the thickness of objects. In the use of such probes the travelling time of ultrasonic vibrations between transmission and reception is utilised for effecting a measure of thickness and the invention relates to probes in which the vibrations before reception return to a probe-object interface after reflection from the boundary of the object opposite the face contacted by the probe. The use of a single electro-acoustic transducer both as a transmitter and a receiver has the disadvantage that spurious echoes caused by internal reflection within the probe itself or by reflection from the interface between the probe and the object tend to obscure the echoes reflected from the boundary. This difficulty may be overcome by transmitting and receiving by means of two separate probes each having an electro-acoustic transducer, but the disadvantage then arises that the probes required for application a comparatively large area of surface of the object which may not be available, particularly if the surface has a small radius of curvature. An object of the invention is the provision of a form of probe whereby this disadvantage may be at least largely avoided.

An ultrasonic thickness probe in accordance with the present invention is in the form of a unit including two members formed with adjacent contact faces separated by a small distance and arranged to engage the surface of an object the thickness of which is to be determined, means for insulating each member against the transfer of ultrasonic acoustic energy from the other member, an electro-acoustic transducer associated with each member which is adapted to transmit ultrasonic acoustic energy between the transducer and the contact surface of the member and means for screening against electrical energy transfer between each transducer and its terminal and the other transducer and its terminal.

In one form of the invention a casing containing the transducers and terminals is divided by a metal screen separating each transducer and its terminal from the other transducer and its terminal and serving to prevent the transfer of electrical energy; and the means for insulating each member against the transfer of ultrasonic acoustic energy from the other member comprise a gap, which should desirably not be less than 1/32 inch, mainly filled with air and a relatively thin portion of the screen extends into the gap. Suitably the said portion is constituted by a sheet of metal foil.

The invention will now be described, by way of example, with reference to the accompanying drawings, in which:

Figure 3 is an elevation of the probe in section on the line III—III of Figure 1, omitting any representation, however, of a brass plate 25 and brass foil 31, hereinafter referred to;

Figure 1:
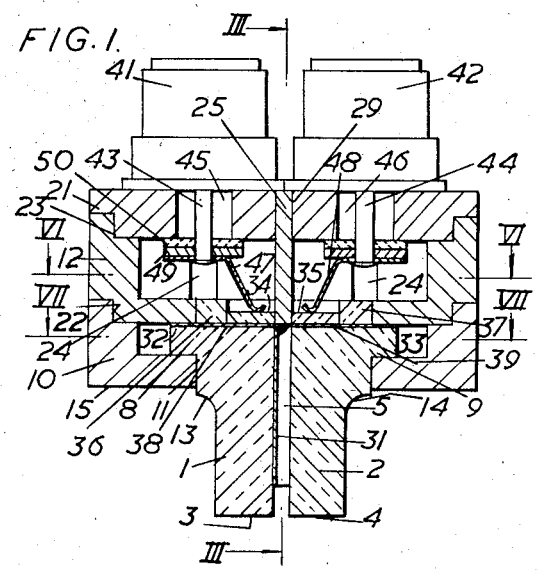
Figure 1 is an elevation of an ultrasonic thickness probe in section on a central plane.
Figure 2:
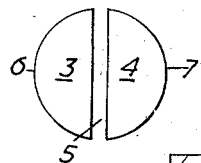
Figure 2 shows the shapes and relative positions of the contact faces of the probe.
Figure 3:
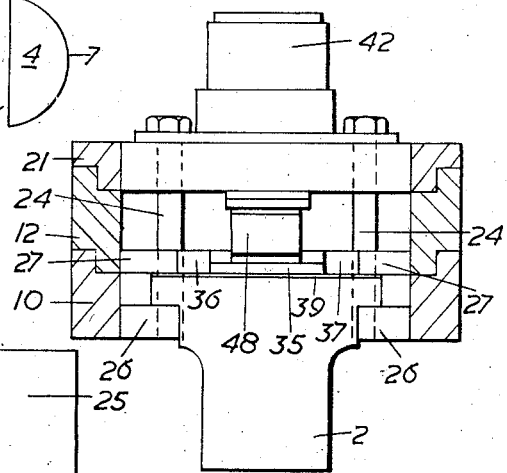
Figure 4:
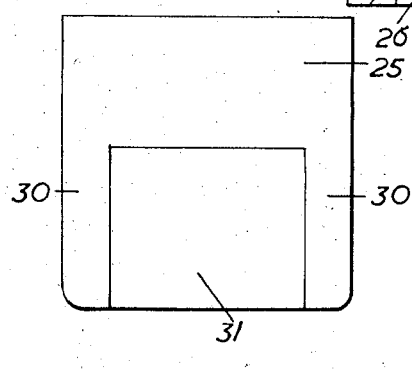
Figure 4 is an elevation of the said brass plate 25 and brass foil 31.

Figure 5 is a plan view of the probe with sockets 41 and 42 and contact fingers 47 and 48, hereinafter referred to, removed;

Figures 6 and 7 are plan views in section respectively on the lines VI—VI and VII—VII of Figure 1; and Figure 8 is an outside elevation of the probe, illustrating its method of employment.

Referring to the drawings, the ultrasonic thickness probe provides two members 1 and 2 of the material known by the registered trademark "Perspex," having respective contact faces 3 and 4 of small area, of the order of 0.2 square inch, intended to engage the surface of the object the thickness of which is to be determined. "Perspex" is a synthetic thermoplastic resin chemically described as polymethyl methacrylate.

The members 1 and 2 in cross-section are of arcuate form and are disposed on opposite sides of an air gap 5 with their respective curved peripheries 6 and 7 lying on a circle. The member 1 at its end remote from its contact face 3 is formed with a peripheral flange 8 and the member 2 at its end remote from its contact face 4 is formed with a peripheral flange 9, and the flanges 8 and 9 are located and clamped between a first or bottom brass ring 10 through an aperture 11 in which both members project and a second brass ring 12. The parts of the members which fit within the circular aperture 11 in the first ring 10 are curved to a larger radius than those parts of the members projecting from the first ring 10, the change from the larger to the smaller radius gradually varying as shown at 13 and 14 over a short length of each member adjacent the outer surface 15 of the first ring 10.

The second ring 12 is engaged by a brass cover 21. The first ring 10 and the second ring 12 engage by a spigot and socket joint 22, and the second ring 12 and the cover 21 engage by a spigot and socket joint 23. The second ring 12 is clamped between the first ring 10 and the cover 21 by four screws 24 passing through the cover 21 and screwing into the first ring 10.

Incorporated in the probe is a substantially rectangular brass plate 25, 1/16 inch thick, which fits through diametrically opposite slots 26 in the sides of the aperture 11 of the first ring 10, to which the plate 25 is soldered. The plate 25 passes through diametrically opposite slots 27 in the sides of an aperture 28 in the second ring 12 and the upper end of the plate 25 fits into a diametrically extending slot 29 formed through the cover 21. At its end remote from the cover 21 a central part of the plate 25 is cut away to form a space, leaving side limbs 30. The ends of the flanges 8 and 9 of the members 1 and 2 engage the side limbs 30 of the plate 25 which serve to maintain the gap between the members 1 and 2. In the space between the limbs 30 of the plate 25 a sheet 31 of brass foil is accommodated, the edges of the foil being soldered to the plate 25 along the three sides of the plate bounding the space. The central part of the plate 25 is cut away only below the level of the upper surfaces 32 and 33 of the members.

Upon the said upper surfaces 32 and 33 of the "Perspex" members are held sheets 38 and 39 respectively of aluminium foil, the radially inner parts of which are contacted by the metallized lower faces of piezoelectric crystals 34 and 35 respectively, located within the aperture 28 in the second ring 12, from which the crystals are separated by respective portions 36 and 37 of a ring also of "Perspex," having their ends in contact with the opposite sides of the plate 25. The crystals 34 and 35 lying within said ring portions 36 and 37 are of arcuate form.

Sockets 41 and 42 suitable for use with co-axial cables are mounted on the outer side of the cover 21 by the screws 24 and from the sockets 41 and 42 respective pins 43 and 44 extend downwardly through respective holes 45 and 46 in the cover, being spaced from the walls of the said holes. The ends of the pins 43 and 44 are riveted over respective spring contact fingers 47 and 48 which respectively engage by metallized upper faces of the crystals 34 and 35. The metallization of the upper crystal faces may be arranged to stop short of the inner edges of the crystals, or other steps may be taken to prevent short-circuiting of the crystal upper faces. Between each finger and the cover 21 is a brass washer 49 and a mica washer 50 on the correpsonding pin, the mica washer 50 lying above the brass washer 49 between the latter and the cover 21.

In use, the probe is held in the hand and the contact faces 3 and 4 of the probe are pressed against a surface 61 (referring to Figure 8) of the object 62 of which the thickness is to be measured, effective acoustic contact being ensured by employing one of the usual couplant media, suitably grease, and pulses of alternating electric potential of ultrasonic frequency are applied to one of the crystals 34 and 35, say the crystal 34, which generates corresponding pulses of sound waves of ultrasonic frequency which travel downwardly along the Perspex member 1 to the contact face 3 thereof and thence into the body of the object. In the object the waves travel to the opposite surface 63 thereof and are there reflected to travel back towards the probe. The acoustic energy received by the contact face 4 of the Perspex member 2 is transmitted upwardly along the member 2 and the other crystal 35 generates alternating electric voltage pulses of which the time delay relative to the pulses applied to the crystal 34 affords a measure of the thickness of the object. The said time delay is determined by rendering it visible at a distance between indications on the screen of a cathode ray tube.

The mean thickness of the object over a small area of the object is obtained. The probe may be used on a flat object or, as indicated in Figure 8, on a curved object, and the radius of curvature of the curved object may be small.

The gap 5 separating the members 1 and 2 insulates each member against the transfer of ultrasonic acoustic energy from the other member. Only the ends of the flanges 8 and 9 of the members, aside from the main path of acoustic wave travel along the members, engage the plate 25. The transfer of ultrasonic acoustic energy from one crystal to the other crystal across the probe may be impossible, since the crystals may not touch the plate 25; but even if they lightly touch the plate, the transfer will be negligible since the crysstals are designed to vibrate parallel to the plate, and the waves of any such transfer would have to propagate repeatedly across boundaries between media of different acoustic impedance. In the described assembly of the first and second brass rings and the cover, which constitutes a casing for the crystals and the electric leads thereto, the brass plate 25 and foil 31 form an earthed screen serving to insulate each crystal and the lead thereto against the transfer of electrical energy from the other crystal and the lead thereto. The brass foil 31 assists in the inhibition of electrical energy transfer from one crystal or lead to the other crystal or lead without destroying the property of the air gap 5 to insulate against the transfer of ultrasonic acoustic energy. The location of the foil in the air gap, whether central or, as shown, to a side of the air gap, is immaterial.

What we claim is:

1. An ultrasonic thickness probe comprising, in combination, means forming a casing; a pair of relatively elongated, substantially identical solid ultrasonic acoustic energy transmitting members secured within said casing to project therefrom in substantially parallel relation to each other; each member having a contact face on its outer end arranged to engage the surface of an object the thickness of which is to be determined, and said members, including their contact faces, being slightly spaced from each other to provide an air gap therebetween for insulation against the transfer of ultrasonic acoustic energy therebetween; a pair of electro-acoustic transducers each associated with the inner end of one member; electric terminal means extending from each transducer; and a metal screen within said casing separating each transducer and its terminal means from the other transducer and its terminal means to inhibit electrical energy transfer therebetween.

2. A probe as claimed in claim 1, wherein the means for insulating each member against the transfer of ultrasonic acoustic energy from the other member includes a relatively thin portion of the screen extending into such air gap.

3. A probe as claimed in claim 2, wherein the relatively thin portion of the screen is constituted by a sheet of metal foil.

4. A probe as claimed in claim 1, wherein the members in cross-section are of arcuate form and are disposed on opposite sides of a gap with their curved peripheries lying on a circle.

5. A probe as claimed in claim 1, wherein the members are formed at their ends remote from their contact faces with a peripheral flange located between a first or bottom metal ring through which the members project and a second metal ring within which the electro-acoustic transducers are located, said rings forming part of said casing means.

6. A probe as claimed in claim 5, wherein a metal cover in engagement with the second ring but spaced from the transducers carries the terminal means of the transducers.

7. A probe as claimed in claim 6, wherein the two rings and the second ring and cover are respectively formed with spigot and socket joints and the second ring is clamped between the first ring and the cover.

8. An ultrasonic thickness probes as claimed in claim 6, wherein the terminal means include terminals mounted on the outer surface of said cover and elements extending from said terminals through apertures in said cover, in electrically isolated relation therewith, into electrical connection with the respective transducers.

References Cited in the file of this patent

UNITED STATES PATENTS

| | | |
|---|---|---|
| 1,688,714 | Hund | Oct. 23, 1928 |
| 2,068,744 | Gutzke | Jan. 26, 1937 |
| 2,096,826 | Schrader | Oct. 26, 1937 |
| 2,507,636 | Kistler | May 16, 1950 |
| 2,545,309 | Roberts | Mar. 3, 1951 |
| 2,748,369 | Smyth | May 29, 1956 |